Dec. 1, 1953   R. J. HERBOLD   2,660,792
APPARATUS FOR AIDING THE LANDING OF AIRCRAFT
Filed Aug. 9, 1951   2 Sheets-Sheet 1

Inventor
Robert J. Herbold
By Clayton I. Jenks
Attorney

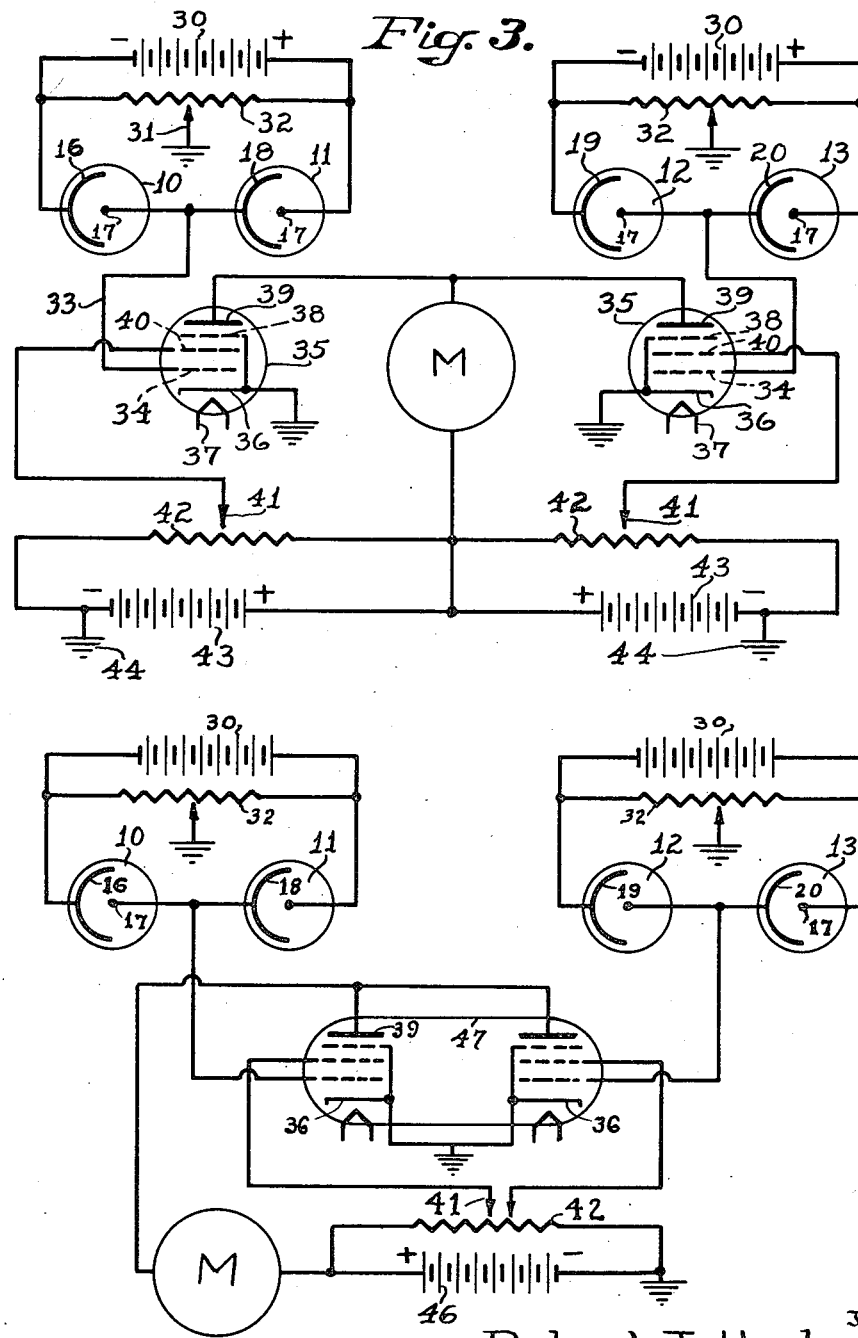

Patented Dec. 1, 1953

2,660,792

UNITED STATES PATENT OFFICE 2,660,792

APPARATUS FOR AIDING THE LANDING OF AIRCRAFT

Robert J. Herbold, Denver, Colo., assignor to Lafayette M. Hughes, Denver, Colo.

Application August 9, 1951, Serial No. 241,130

1 Claim. (Cl. 33—46)

This invention relates to an apparatus for aiding the landing of aircraft, and particularly to electronic apparatus on the craft associated with lines of light parallel with the runway for determining the craft altitude or position.

In accordance with my Patent Number 2,489,220 of November 22, 1949, the altitude of an aircraft relative to a runway is determined by its relation to the directional angle of reception of a beam from a single line of light extending parallel with and at a known distance from the runway center line. In the use of that construction, the craft must be aligned vertically with the runway by another line of light on the runway center line, since the directive angle of the light varies with a lateral change in position of the craft. My Patent Number 2,489,222 of November 22, 1949 describes both a special photo-tube and an arrangement of two pairs of such photo-tubes mounted on the wing tips which are separately activated by a single line of light for determining the altitude. The light extends along the center line of the runway similar to the center light line in the other construction and so presents a constructional problem or an obstacle to the safe landing of craft. Two electric circuits are so arranged that the photo-tubes on each wing tip observe the light angle and govern a separate meter, and the point of crossing of the two indicator needles relative to a scale line indicates the altitude of the craft.

The primary object of this invention is to provide a simplified type of electronic apparatus on an aircraft in association with two parallel lines of light at the sides of the runway which will determine the craft altitude or position without requiring that the craft be aligned with the runway center line. Further objects will be apparent in the following disclosure.

In accordance with my invention, I provide two lines of light on opposite sides of and parallel with the runway center line, and I employ two photo-cells, or two balanced pairs, which separately and simultaneously view and electrically derive the altitude from the directive angle of the light lines as the craft approaches properly for a landing. This is accomplished by means of light sensitive elements so arranged with associated shields that the activation of each element varies with the direction of the light therefrom. The electrical circuits are such that the sum of the electrical outputs of the photo-cells governs a single guidance apparatus, such as a meter calibrated to give an indication of altitude or craft position relative to the lights.

Referring to the drawings illustrating the invention:

Fig. 3 is a wiring diagram for the electronic circuits; and

Fig. 4 is a modified wiring arrangement.

Various types of photo-cells may be employed, but they are preferably photo-tubes of the type described in my Patent Number 2,489,222, wherein each is so constructed and arranged that its electrical output varies with the directive angularity of the activating light beam. This preferred form of photo-tube has a shield arranged to cause a greater or lesser area of the cathode to be activated as the light angle changes. I have found that if two lines of light are spaced equally and widely from the runway and are parallel with the vertical plane of the runway center line, and if they are optically scanned simultaneously by similar or electrically related photo-cells, their electrical outputs may be added together, as is later explained, and used to control a single electrical guidance device, such as an altitude indicating meter. This electrical sum approaches accuracy for the various lateral positions which the craft may take relative to the runway center line as the craft descends for a landing and gets closer to the ground, so that it is not necessary to align the craft with the runway except as is needed for the landing.

Figure 1:
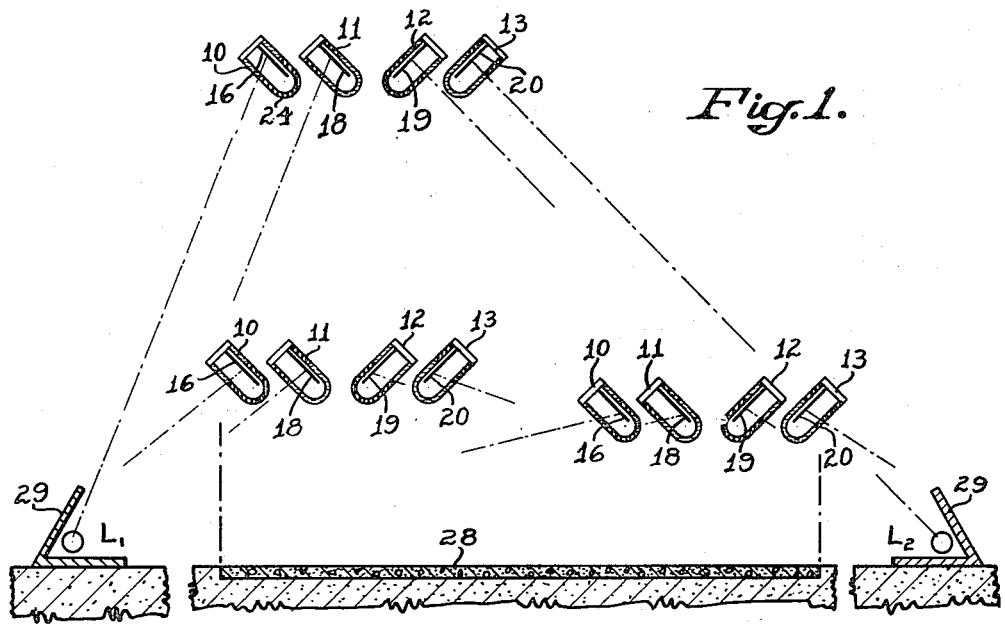
Fig. 1 is a diagrammatic transverse section of an airport runway with its light lines and showing the relation of the lights to the associated photo-tubes for various positions of the craft.
Figure 2:
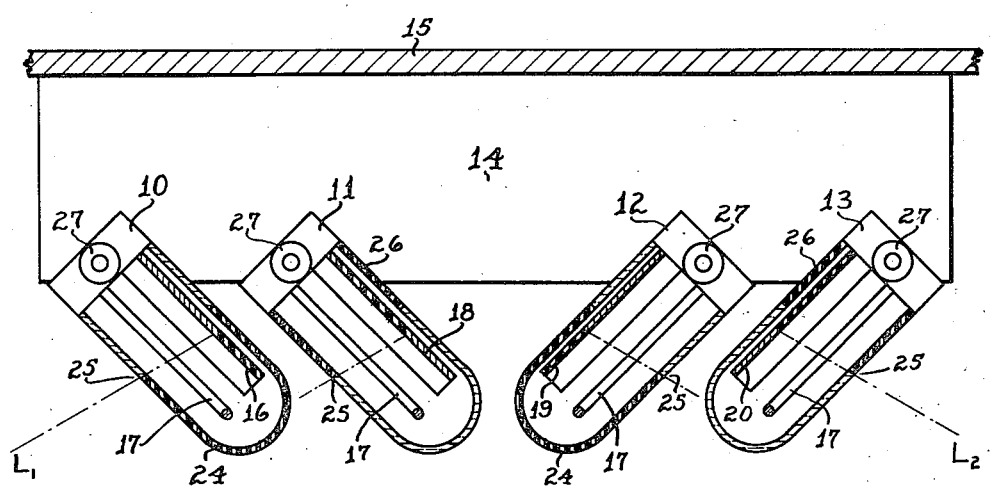
Fig. 2 is a diagrammatic view of an electronic apparatus having four associated photo-tubes depending below an aircraft.

Referring first to Figs. 1 and 2, the construction is illustrated diagrammatically as comprising two pairs of balanced photo cells 10, 11, 12 and 13, although single unbalanced cells 10 and 12 will serve in limited applications. Each cell depends at a suitable and the same angle, such as 45°, from a horizontal plane represented by the bottom of a box 14 which carries the required electrical apparatus. The box is so mounted relative to the under side of the aircraft 15 that the photo-cells are held in an optically observing position, and preferably centrally of the line of flight. Each of these photo cells may be made as described in my Patent 2,489,222, and it comprises a light sensitive cathode and an anode enclosed in a transparent envelope, such as a glass shell providing an evacuated or gas-filled space. Within the transparent shell of the tube 10 is a cathode 16 of suitable shape, preferably either cylindrical or a part cylindrical having its concave side facing the light. It is associated with a suitable anode 17, such as a straight wire or a rectangular metal frame. Likewise, the tubes 11, 12 and 13 have cathodes 18, 19 and 20 respectively and associated anodes 17 mounted in a similar arrangement. Each cathode is activated in accordance with standard procedure, and it may comprise a silver base carrying a coating of caesium on caesium oxide that has been suitably sensitized. The cathodes are made alike and have the same or related light sensitive areas, and the tubes have as near as possible identical characteristics.

As set forth in my prior patents and to which reference may be had for further disclosure, the photo-cells are operated at saturation voltage for minimum light conditions and so that the electron emission from each cathode is directly proportional to the area of the cathode that is light activated by the runway light. To control and vary that light exposed area according to the craft altitude and the directional angle of the activating light, each photo-tube is provided with a shield of an opaque or a light filtering material, and preferably a substance that is opaque to infra red light, such as a nitrocellulose film containing dispersed graphite applied on the outside of the transparent glass tube. Infra red light passes readily through fog, rain and snow and so may be observed during blind flying. The shields 24 of tubes 10 and 12 surround the lower half of each tube and provide a shadowing edge 25 opposite the horizontal center line of the cathode 16 or 19, and it covers or shields the lower half of the associated cathode when the light is perpendicular thereto. The shield preferably extends all the way around the tube to minimize the possibility of undesired light striking the cathode, and the edge portion 25 lies in a plane which is perpendicular to the axis of the cylindrical tube 10 or 12. Similarly, the other tubes 11 and 13 of the associated pair have each an opaque shield 26 which covers the upper half of the cathode 18 or 20. The tubes 12 and 13 correspond respectively with tubes 10 and 11 in their construction and arrangement. Each shield is so spaced at a short distance from the cathode that the variation in light angle will cause the shadow to move appreciably and vary the activated area of the cathode enough for the required measurement. The shield spacing is preferably such that the change in light angle, as the craft approaches for a landing, will vary the activated area between nearly a maximum and a workable minimum.

The tubes may be arranged, as shown in Fig. 2, with the center lines of tubes 10 and 11 and the tubes 12 and 13 respectively parallel, but with the two sets of tubes tilted at angles of 45 degrees to a horizontal plane and towards each other, and which are so arranged that the cathodes of each pair of tubes face outwardly and optically view that line of light which is on the same side of the craft. That is, tubes 10 and 11 view the light $L_1$ at the left and tubes 12 and 13 view light $L_2$ at the right. The tubes may be supported on suitable pivoted mounts 27 which provide for a small angular adjustment, such as 10 or 20 degrees. The mounts are fixed after adjustment, so as not to affect the light angle.

The two lines of light are preferably horizontal and spaced widely from the center line of the runway 28 so as to narrow the directive angle of the light beam for a reasonable craft altitude, and the lights are preferably shielded by opaque shields 29 so that they cannot be simultaneously observed unless the craft is between them or aligned with the runway, and the light angle is less than a suitable degree, such as 60°, from a horizontal plane at the light. The parallel light lines $L_1$ and $L_2$ may be suitably spaced, such as 200 feet or more away from the outside of the runway, and they extend throughout the effective distance of craft approach, such as half a mile beyond the runway in a horizontal or desired plane. The light spacing depends primarily on the required altitude of the craft when it first views the lights, as well as other conditions, such as the intensity of light employed. Any suitable light source predominant in infra red rays which can be viewed through a dense fog will serve. Because of the craft speed, the light need not be a continuous line but may comprise separate spaced electric bulbs. The lights may be steady or modulated to flash at a definite frequency, and in the latter case the electronic apparatus will include a suitable band pass filter system to make the meter responsive only to the selected frequency band of the flashing lights.

As indicated by the heavy hatch lines in Figs. 1 and 2, the shield 24 of tube 10 which scans and is activated by light $L_1$ shades the lower portion of the cathode from light to an extent which depends on the light angle; and the lower the craft is relative to the ground, the greater is the illuminated area, up to a maximum or full activation for a horizontal light beam. Likewise, the cathode 19 of the similar cell 12 which scans the light $L_2$ has a portion illuminated according to the light angle. The other tubes 11 and 13, which serve to balance the tubes 10 and 12, are arranged with their shields covering the upper half of the cathode, and their area of activation decreases as the craft approaches the ground where the light travels substantially horizontally and the cathode illumination is substantially zero. For a light angle of 30°, as shown by the heavy hatch lines in Fig. 2, tube 10 has about two-thirds of its cathode area activated, and tube 11 has about one-third of the cathode exposed to light. The tubes 12 and 13 which observe light $L_2$ have their areas illuminated similarly to tubes 10 and 11. If the craft is nearer light $L_1$ than light $L_2$, as indicated at the upper and left hand parts of Fig. 1, the tube 10 cathode will receive less light than does tube 12, and tube 11 more than tube 13. But the sum of the illuminated areas of the associated cathodes is not varied to a material extent by the lateral displacement of the craft, provided it is over the runway and well inside of the shielded light beams. As the craft gets closer to the ground, the light angles approach zero relative to a horizontal plane, and the difference in area activation becomes less for a given lateral displacement of the craft. When the craft has almost reached the ground and the altitude measurement is critical, the cathodes of tubes 10 and 12 are nearly fully illuminated, and the other two 11 and 13 receive nearly the minimum of light. Any variation in the lateral position of the craft affects this cathode illumination only to a minor extent. That is, as the craft nears the ground, the instrument reading becomes increasingly accurate, whatever may be the lateral position of the craft relative to the runway center line. Thus, it will be appreciated that the electrical output of the balanced phototube sets may be added, and the sum will serve to control a suitable craft or pilot guidance apparatus, such as a meter calibrated to give approximately the craft altitude.

The four photo tubes are so connected in their circuits as to govern a single altimeter instrument, such as a milliammeter M which is calibrated in units of altitude. The preferred electronic circuits illustrated in Fig. 3 comprise two halves which are alike. The left hand half of the figure relating to tubes 10 and 11 has these two tubes mounted in series with a battery 30 or other source of power so that each forms a load for the other. A contact 31 which is grounded to the aircraft framework varies the resistance of a potentiometer 32 which is connected across the battery terminals between the anode 17 of tube 11 and the cathode 16 of tube 10. This bridge circuit is balanced by varying the position of the contact arm 31 when the two photo-tubes are exposed to the same light conditions. The cathode 18 of tube 11 and the anode 17 of tube 10 are connected as illustrated, and a common terminal wire 33 leads to the grid 34 of a suitable amplifier, such as a triode or the pentode 35 illustrated. The cathode 36 which is grounded to the craft framework is heated by a supplemental heater and circuit 37, as is understood. The cathode is further connected to a suppressor grid 38 arranged between the cathode and the anode 39. A screen or grid 40 serves the usual purpose, and this is connected through a variable contact 41 with a resistance 42 which is connected with the terminals of a battery 43 that is grounded at 44. The anode 39 and the positive terminal of battery 43 connect through the milliammeter M. The grid 34 is normally biased to a negative condition and is made more negative by the electron emission of the photo-tubes, so that the amplifier output is governed by the relative conductivity of the cells 10 and 11. Similarly, the circuit at the right hand side of Fig. 3, which is governed by the tubes 12 and 13, has its battery 43 grounded at 44 and connected at its positive terminal through a common lead to the milliammeter M. The anodes of the two pentodes 35 are connected together and to the other terminal of the milliammeter M. The resistances 32 are primarily for the purpose of balancing the two associated cells to obtain a desired reading on the meter for a given altitude, such as a zero reading for the ground level. The resistance 42 controls the grid 40 to bring the amplifier action within the scale of the meter. A modification of the circuit is shown in Fig. 4 in which a single battery 46 is substituted for the two batteries 43 and 44 of Fig. 3, and the two amplifiers are combined in the single tube 47, or they may be separate as shown in Fig. 3. Various other modifications in the circuit will be apparent to one skilled in the art.

One photocell of each pair serves as a balance for the other, so as to cancel the effects of extraneous sources of light and particularly to balance the variation in activation caused by a change in light angularity, this being proportional to the cosine of the angle of incidence of the light on the cathode. The differential between the light activation of the two light sensitive elements of the tubes 10 and 11 or tubes 12 and 13 is employed to control the grid 34 of the related amplifier. The additive sum of both amplifier currents governs the milliammeter M. Since these tubes are arranged side by side, they are affected equally by ambient light or variations in light density, due to clouds, except as governed by the difference in shielding of the two cathode surfaces. Hence, the amplifier is governed solely by the directive angularity of the light beam and the meter M is governed by the sums of the areas of illumination of each of the respective cathodes as provided by the shields.

If one tube receives more light than the other tube of the pair, its resistance decreases and the voltage distribution between the two tubes changes. That voltage distribution in the phototube circuit controls the potential of the associated amplifier grid. When the potential of the grid, which is normally biased negatively, is made more negative, a greater current flow is produced by the amplifier. The currents of the left and right hand circuits flow in the same direction and thus are added together at the ammeter M. Hence, as the craft descends, the additive amperage increases in the circuit illustrated and the meter needle is moved accordingly to indicate the altitude as derived from the directive angles of the two light rays as the craft altitude or position varies relative to the light lines. As the craft position varies laterally for the same altitude, one cathode will receive more light than its associate, but the sum of the two illuminated cathode areas of the tubes 10 and 12 or of the tubes 11 and 13 is sufficiently near the same value for any lateral position of the craft relative to the two lines of light to give a satisfactory altitude reading, provided the aircraft is over the runway and where the tubes can observe the light rays that are caused by the shields 29 to be within an angle of 60° to the horizontal plane.

Many variations in the construction and use of the apparatus will be readily apparent to one skilled in the art. It will also be understood that the above disclosure of the principles of this invention and a preferred embodiment is not to be interpreted as imposing limitations on the appended claim.

I claim:

An apparatus for aiding the landing of aircraft on a runway comprising two horizontal lines of light sources spaced widely from and located on opposite sides of the runway in parallel with the vertical plane of the runway center line and extending throughout the effective distance of aircraft approach, two electronic sets on the craft comprising two pairs of photo-cells, the pairs facing oppositely towards the light lines and mounted in a fixed angular arrangement so that each pair views only one light line when the craft is over the runway, related cells of the pairs having similar light sensitive elements and light shields arranged to provide a progressively varied area of element activation as the directive angle of a light ray from its associated light line changes relative thereto, the photo-cells of each pair being electrically opposed in a separate balanced circuit so as to minimize the effects of ambient light and variations in light intensity, two separate amplifiers, one being governed by the relative conductivity of the cells of one pair and the other being similarly governed by the cells of the other pair so that each amplifier output is directly related to the cell activation produced in its associated set by the viewed light line, and a single electrical apparatus including a circuit interconnected with the two amplifiers arranged in parallel and controlled by the added output of the amplifiers which is responsive to a variation in the craft altitude irrespective of the lateral position of the craft relative to the runway center line when both lines of light are observed simultaneously by the two pairs of photo-cells.

ROBERT J. HERBOLD.

References Cited in the file of this patent
UNITED STATES PATENTS

| Number | Name | Date |
|---|---|---|
| 2,350,820 | Rettinger | June 6, 1944 |
| 2,489,220 | Herbold | Nov. 22, 1949 |
| 2,489,222 | Herbold | Nov. 22, 1949 |